Figure 1:
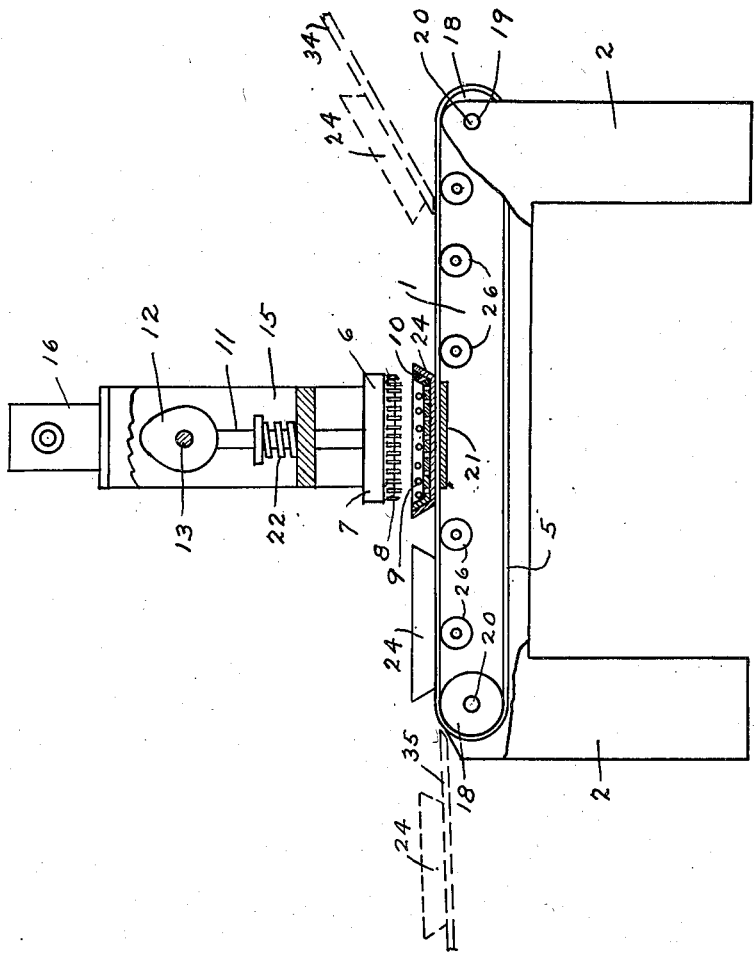

Aug. 23, 1938.   E. V. PANTHER   2,127,651
CAKE AND PIE CRUST PERFORATOR
Filed April 23, 1937   2 Sheets-Sheet 1

Inventor
EUGENE VINZENT PANTHER
By Howard J. Whelan.
Attorney

Inventor
EUGENE VINZENT PANTHER

By Howard J. Whelan,
Attorney

Patented Aug. 23, 1938

2,127,651

UNITED STATES PATENT OFFICE 2,127,651

CAKE AND PIE CRUST PERFORATOR

Eugene Vinzent Panther, Baltimore, Md., assignor of one-half to John H. Miller, Baltimore, Md.

Application April 23, 1937, Serial No. 138,637

1 Claim. (Cl. 107—15)

This invention refers to food baking equipment and more particularly to a perforator for pie crusts and cakes. Its main objects include the making of a device or machine that will mechanically perforate pie crusts and the like in order to improve the resulting product and shorten the baking process, and to provide an arrangement for positively relieving excess gas or steam from the dough while being baked. The object, is to have the device simple in construction and effective in action, and capable of handling one or more pie crusts at a time and with an automatic action. Other objects will become apparent as the invention is more fully set forth.

While perforators for pie crusts have been provided in the past, the purpose of such has been primarily for designating the type or kind of pie it is, since, with the pie crust on, difficulty is experienced in determining what each is, specifically. In such cases, only the upper crust of the pie is perforated, and that in a limited form. In this invention, the top and bottom crusts of the pie are perforated. The purpose of this is to eliminate the possibility of bubbles forming and undue breaking of the crust which will otherwise occur. Further, by having the crusts perforated completely, that is, uniformly and closely across its entire surface, the pie crust is better, more perfectly baked, and keeps its shape better. The perforators consist of a suitably spiked brush which strikes into the dough of the raw pie crust, operated at intervals by suitable mechanism, after which the pie crust is carried to the bake oven or shelf.

In the construction shown in the drawings:—

Figure 2:
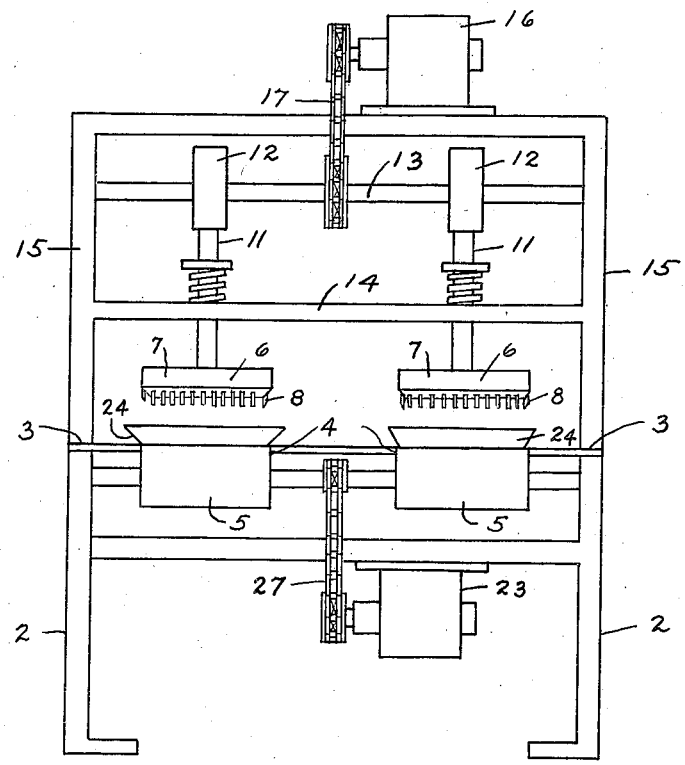
Figure 3:
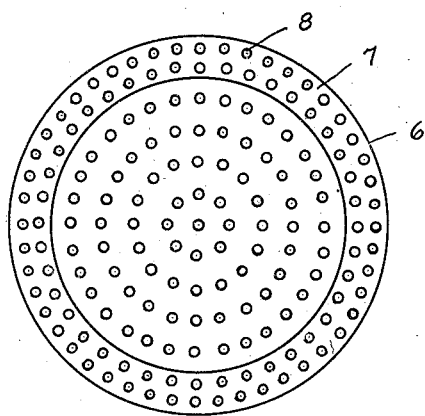

Figure 1 shows the side view of a perforating device embodying this invention, partly in section, Figure 2 is an end view of the device, and Figure 3 is a view of the brush and spikes showing a preferred arrangement or design for perforation of the pie crust dough.

Similar reference characters refer to similar parts throughout the drawings.

In the drawings, 1 is a table of somewhat conventional form having supporting legs 2 to place the top 3 at a suitable operating height. The top is provided with openings 4 for the operation of a conveyor 5 in each. A perforating brush 6 reciprocates above each conveyor and consists of a brush back 7, with spikes 8 arranged to suit the form of the pie crust 10, so as to uniformly perforate same closely with holes 9. A handle bar 11 is adjustably secured to the back of the brush and raises and lowers same under the action of a cam 12 mounted on a shaft 13. A guide member 14 serves to keep the handle bar 11 in line and operating properly. The shaft 13 and guide member 14 are supported above the upper plane of the table top 3 by side brackets 15. The shaft is rotated by a motor 16 through suitable gearing 17. The conveyor is of flexible type supported on end rollers 18 attached to the table in bearings 19 on their shafts 20. The conveyors pass across the table and openings 4 as indicated in the drawings, under the brushes 6 and over metal plates 21. These plates serve to make the conveyors rigid while passing under the brushes, and enable the pie crusts, in their metal receptacles, to get the proper force of the blows when struck by the perforating brushes. A coil spring 22 is provided in connection with each handle 11 to give it resiliency and a return movement as the respective cam member retreats. The conveyors may be operated by any suitable means, such as a motor 23, gearing 27, but for small installations, the conveyors are simply pushed along by hand, after the pie crusts are perforated.

The operation of the device is as follows. The pie crust, in its container pan 24 is placed on the conveyor belt and positioned under the perforating brush and held there.

The brush brings down its spikes into the pie crust dough as the cam member 12 forces down on the end of the handle bar 11. This makes the desired holes, the adjustment being such as to prevent injury to the pan. As the cam retreats, the handle bar with its brush attached, rises under the influence of the spring 22 and allows the pie crust and pan to be pushed out of the way. The same process is utilized on the other brush and pie crust. If it is desired to have the oncoming pies conveniently placed, a plane surface or table 34 may be placed in front of the table as indicated, and a receiving table 35 on the outgoing end. Suitable rollers 26 are placed along the travel of the conveyor to be aligned properly and prevent sagging.

While but one form of the invention is shown in the drawings it is not desired to limit this application for patent to the specific form or construction indicated, otherwise than limited by the prior art, as it is appreciated that other construction might be made that would employ the same principles and come within the scope of the appended claim.

Having thus described the invention, what is claimed is:—

In a pie crust perforating machine, the combination of a table adapted to receive and support pie plate containers, each container being arranged to hold the bottom of a pie-crust and walls thereof diverging upwardly, a perforating brush back having a flat bottom and diverging peripheral sides mounted above the table and operating vertically in a reciprocating manner aligned with the said containers and pie crust therein, spikes on the flat bottom and diverging peripheral sides of the said back arranged concentrically on the same and adapted to perforate the bottom and the diverging side walls of the pie crust in the container as the brush back is reciprocated, a frame for supporting and guiding the brush back in its reciprocating movement, a spring connected with the back and acting thereon to actuate the same in one direction, a cam mechanism for actuating the back against the action of the spring in a reciprocating manner, and means for supporting and operating the cam mechanism.

EUGENE VINZENT PANTHER.